Jan. 31, 1950 L. W. HOUGHTON ET AL 2,495,726

FREQUENCY DIVIDING ARRANGEMENT

Filed May 9, 1944 2 Sheets-Sheet 1

Inventors
Leslie Wilfred Houghton.
Dermot Min Ambrose
By
Robert Harding Jr.
Attorney Inventors
Leslie Wilfred Houghton.
Dermot Min Ambrose.
By Robert Harding Jr.
Attorney Patented Jan. 31, 1950

2,495,726

UNITED STATES PATENT OFFICE 2,495,726

FREQUENCY DIVIDING ARRANGEMENT

Leslie Wilfred Houghton and Dermot Min Ambrose, London, England, assignors, by mesne assignments, to International Standard Electric Corporation, New York, N. Y., a corporation of Delaware Application May 9, 1944, Serial No. 534,836
In Great Britain May 12, 1943

3 Claims. (Cl. 250—27)

The present invention relates to frequency dividing arrangements.

Constantly increasing demands for synchronising devices in telecommunications technique, especially where mechanical means are not used, in the study of sub-harmonic processes in various branches of telecommunication and allied fields and equipments as well as the increasing necessity of having to provide for the generation or control of frequencies sub-harmonically related to a master frequency, have amongst other requirements involved extended study and development of sub-harmonic frequency generators.

The present invention aims at providing arrangements by which frequency division may be easily and economically accomplished.

Circuit arrangements according to a broad aspect of the invention for obtaining the output thereof, a frequency which is a desired submultiple of an input master frequency comprises means for producing under the control of the input master frequency a series of electrical pulses each pulse containing a predetermined amount of electrical energy and whose repetition frequency has a known predetermined relationship to that of said input frequency, energy storing means to which said pulses are applied and means adapted to be operated under the control of said storing means when the energy in this latter attains a value equal to the energy supplied by a predetermined number of pulses depending on said relationship for dissipating the energy in said storing means. This relationship will in most practical cases be one of equality, but it could also be a multiple of the input frequency, for example two pulses for each input frequency period. In such a case, the storing means would operate after receiving a number of pulses equal to twice the sub-multiple required.

In an embodiment of the invention the storing means comprises a condenser and the pulses are arranged to have a constant shape, amplitude and duration irrespective of the input frequency and hence contain equal quantities of energy. The voltage developed across the condenser after a predetermined number of pulses have been fed to it is used to provide a discharge path for the condenser. Thus the discharge circuit operates after every *n*th pulse received by the condenser and the pulse frequency in the output of the discharge circuit will thus be a submultiple of the input master frequency. If a sine waveform is required in the output of the arrangements this is obtained by passing the output of the discharge circuit through a filter designed to pass the required frequency.

In one specific embodiment which will be described more fully in relation to Figure 1 of the accompanying drawings use is made of a rectifier and differentiating circuits and an amplitude limiter, preceded by amplifiers if necessary.

Figure 1:
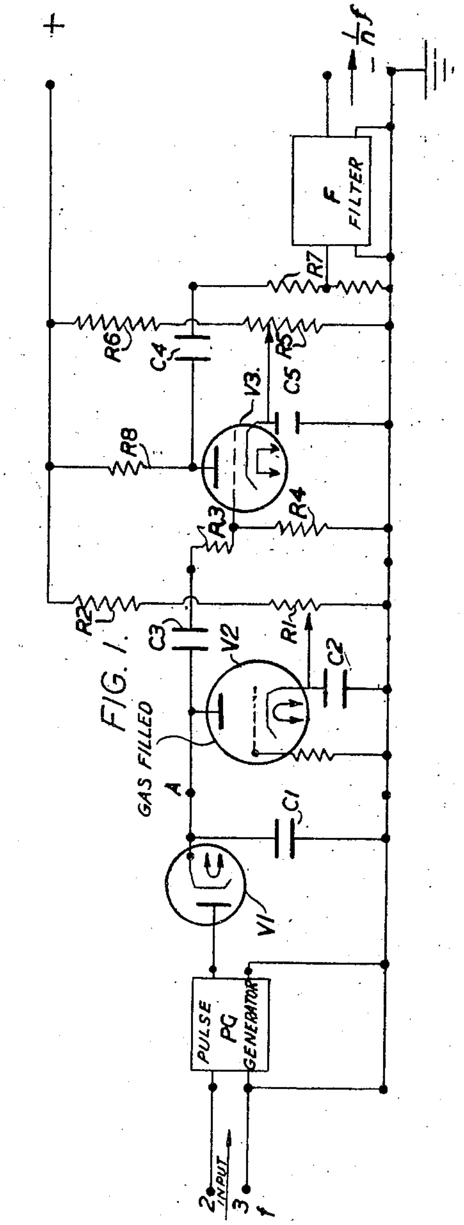
Figure 2:
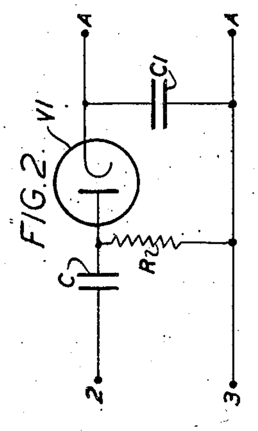

Figure 2 is a detail circuit which may be used in Figure 1.

Figures 3, 4A, 4B:
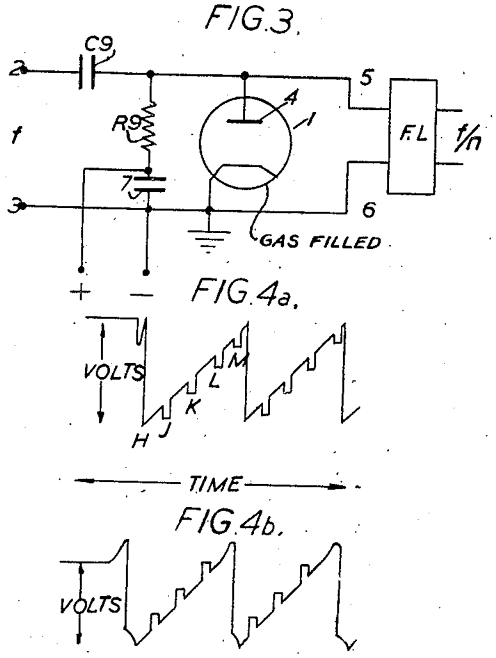
Figure 5:
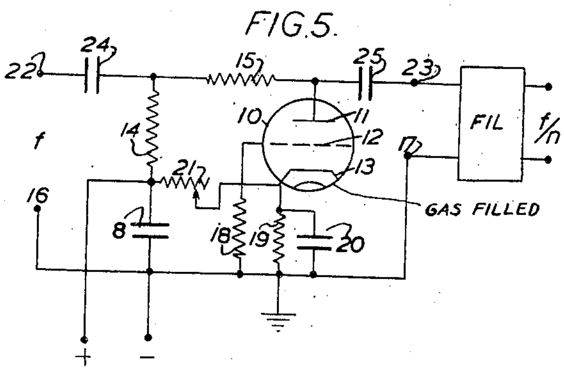

Another specific embodiment is shown in Figures 3 and 5 of the accompanying drawings. In both embodiments use is made of the ionisation control of a gas filled discharge device, such as one known by the registered trade name "Thyratron."

Figure 4 shows explanatory curves.

Referring to Figure 1 of the drawings, a sine wave of master frequency *f* is fed to the input terminals of the amplifier pulse generator represented by the block PG. The first valve of the pulse generator is back biassed to such a point that only the amplified positive tips of the input waves appear at the anode. This pulse is again amplified and then fed as a positive pulse to the storage condenser $C_1$ by means of a diode $V_1$ or some other one-way device. In this case it allows positive pulses to pass through it to charge condenser $C_1$, but does not allow the positive charge thus formed on $C_1$ to leak back down the input circuit. Across $C_1$ is an electron discharge device $V_2$ of the gas-filled type, for example such as known under the registered trade name "Thyratron." The grid bias of $V_2$ is adjustable by means of a variable tap on a resistance $R_1$ in a chain of resistances $R_1$, $R_2$ fed from the high voltage source of supply. $V_3$ is an amplitude limiting valve or it may be some other arrangement for reducing during discharge of $C_1$ the high impedance necessary across $V_2$ during charging of $C_1$. $V_3$ is resistance capacity coupled to $V_2$ by means of condenser $C_3$ and resistances $R_3$, $R_4$, which are of the order of two megohms and one megohm respectively. A condenser $C_2$ provides a by-pass path in the cathode circuit of $V_2$ for high frequency currents as also functions the condenser $C_5$ in the cathode circuit of $V_3$.

The bias on the grid of valve $V_3$ is obtained from a taping $R_5$ on a resistance chain $R_5$ $R_6$ fed from the high voltage supply as shown and a resistance $R_8$ is included in the anode circuit of $V_3$. The anode of $V_3$ is capacity resistance coupled by $C_4$ and $R_7$ to the input of a filter circuit represented by block F which may be any filter designed to pass the required frequency $$\frac{1}{n}f$$

where $n$ is the desired submultiple of the master frequency $f$.

The operation of the arrangement shown in Figure 1 is as follows:

Positive pulses are produced in the pulse generator PG and passed through $V_1$ to $C_1$. As each pulse is received the voltage across $C_1$ increases and at a certain value depending upon the bias on the grid of $V_2$, will initiate the discharge in $V_2$ thus providing a discharge path for the charge on $C_1$. As the charge leaks away from $C_1$ the voltage applied to the anode of $V_2$ drops to a sufficiently low amount that the discharge in this latter ceases and $C_1$ begins to charge up again.

Thus for each discharge of $C_1$ through $V_2$ a sudden voltage drop is applied via $C_3$ to the grid of valve $V_3$ and the voltage steps up as each pulse is fed to $C_1$. Thus the voltage in the anode output circuit of $V_3$ is of a saw-tooth form whose frequency is equal to the master frequency $f$ divided by the number of pulses $n$ fed to $C_1$ between each discharge. The desired submultiple of the master frequency $f$ is obtained by adjusting the negative bias on the grid of $V_2$ by means of $R_1$ so that for a number of pulses applied to $C_1$, equal to the submultiple desired, the voltage across $C_1$, thus applied to the anode of $V_2$ just overcomes the bias of the grid of $V_2$ and initiates the gas discharge. Thus for a specified frequency $f$ substantially any submultiple may be obtained by adjusting $R_1$. Whilst positive pulses have been referred to as being fed to the condenser $C_1$, it will be understood that alternatively the negative pulses may be fed to condenser $C_1$ and necessary modifications made between $C_1$ and $V_2$ to allow for the functioning of the discharge device.

When any other frequency is applied to amplifier-pulse generator PG, however, the quantity of energy in the pulses generated will not be the same as for frequency $f$ for as the input frequency increases the pulse duration decreases. This follows from the fact that as the input frequency increases, the tip of the wave accepted by the amplifier pulse generator PG becomes shorter in duration. In order to utilize the circuit shown in Figure 1 for any frequency it is therefore necessary to provide means for generating pulses which have constant duration irrespective of frequency. as well as of constant amplitude and constant shape. Where these factors are constant the quantity of energy fed to the condenser $C_1$ by each pulse is the same and the voltage across the condenser will then be proportional to the number of pulses on the condenser before discharge and this number can be varied by adjusting $R_1$ to vary the point at which discharge in $V_2$ can take place. Thus the input master frequency will bear a direct relation to the output frequency. The output frequency can be made to follow the input frequency over a considerable range (for example 4000 to 20,000 C. P. S. or greater, at ½, ⅓, ¼, etc., of the input frequency.

A pulse of constant duration irrespective of frequency may be obtained from a sine wave as follows: The input sine wave is fed into a valve in such manner that on the anode of the valve there appears a 50% pulse, that is a pulse whose duration is equal to one half the pulse repetition period. Such a pulse is obtained when most of the positive and negative tips of the sine wave are limited. On passing this pulse through a differentiating circuit as explained hereinafter, pulses herein referred to as differential pulses, are formed on the leading and trailing edges of the 50% pulse. The positive differential pulse only is of interest and only this one will be considered. It is naturally not essential to form a 50% pulse, except that this may be the most convenient one to produce.

If a non-sinusoidal alternating voltage be applied to a high pass filter, a so-called differentiation effect occurs whereby a voltage pulse, a differential pulse, is generated in the output of the filter, the amplitude depending upon the components of the non-sinusoidal wave which are above the cut-off frequency of the filter. Such pulses are termed "differential pulses." Such pulses occur as the input wave passes through zero and alternate positive and negative differential pulses are thus formed.

A convenient form of circuit to use comprises a condenser and resistance connected in series and having a sufficiently short time constant. The differential pulses are then produced across the resistance.

Figure 2 shows such an arrangement applied to the condenser $C_1$ and diode $V_1$ of Figure 1. The input terminals 2, 3 are resistance capacity coupled across the diode $V_1$ and condenser $C_1$ in series. Thus C and R are also in series across the input terminals and form the differentiation circuit. As before $V_1$ only allows the positive pulses to pass to the condenser $C_1$ and prevent the charge on $C_1$ leaking back through R.

The duration of a differential pulse, assuming the differentiating constants R and C to be stable, is in theory, determined by the slope of the leading edge of the 50% or other pulse but in practice the constants of the circuit limit the maximum slope at which the pulse may rise. Thus this slope is substantially constant and hence the duration of the differential pulse is constant. Also the amplitudes of the input pulses will be constant after limitation and hence the amplitude of the differential pulse will also be constant at all frequency inputs. Before application to the condenser $C_1$, the differential pulse may be amplified Thus a unit is obtained to which a wave of variable frequency may be fed giving at the output a wave whose fundamental follows the input frequency, but is at some sub-multiple of the input frequency.

Figure 3 of the accompanying drawings shows in simplified form the basic circuit arrangement according to the second embodiment of this invention. A gas discharge valve 1 has its plate 4 connected through a resistance $R_9$ to the positive terminal of the high tension supply, through a condenser $C_9$ to one input terminal 2, and directly to an input terminal 5. The cathode and the other input and output terminals 3 and 6 are connected to the negative terminal of the supply and preferably also to earth. A large by-pass condenser 7 is connected across the supply for the purpose of connecting the resistance $R_9$ effectively to earth for transient currents.

The pulse of constant duration and amplitude of the master frequency may be derived from the input wave-form in any known manner for example by amplifying and amplitude limiting, or differential pulses may be derived as hereinbefore described with reference to Figures 1 and 2.

The voltage applied to the plate 4 of the valve 1 should be just below the critical ionising voltage, so that when no pulses are applied to the input terminals 2, 3, the full direct voltage is on the plate and the condenser $C_9$ is charged. Then when a pulse is applied, positive or negative as will be explained later herein, the voltage of the pulse together with the direct voltage exceed the ionising voltage of the valve and initiates gas discharge and provides a path for discharging the condenser and the plate voltage drops until the condenser is discharged and the plate voltage is so low as to extinguish the gas discharge. This is the moment represented at H in Figure 4*a*. When the gas discharge ceases, the condenser $C_9$ begins to charge up over resistance $R_9$ and the circuit connected to the input terminals 2, 3 and the voltage on the plate commences to rise as shown from H to J in Figure 4*a*. Assuming now that negative pulses are fed to the input terminals 2, 3, the plate potential drops and rises again in accordance with the pulse wave form as shown at J, and again at K, L and M. At M, the ionising voltage is being approached and at the end of the pulse M the voltage attains the critical ionising voltage and initiates the gas discharge and the process is repeated. Thus the output voltage obtained across the terminals 5, 6 will be of a saw-tooth waveform whose frequency is a submultiple $n$ of the input frequency and the basic frequency of the saw-tooth wave may be obtained by passing the output from 5, 6 through a filter. $n$ is the number of pulses occurring between two discharges. It will be observed that $n$ may be varied by varying the value of capacity $C_9$ or resistance $R_0$ other things remaining constant, i. e. by varying the time constant of the circuit $R_9$, $C_9$.

Figure 4*b* illustrates the process of charging and discharging the condenser utilising positive pulses. In Figure 4*a* it will be observed, that it is not until the fourth pulse after deionisation has occurred that the rapid positive charge of voltage occurring at the trailing edge of the negative voltage input pulses is sufficient to cause ionisation once more due to the slowness with which condenser $C_9$ is permitted to charge. In the case of the positive pulses in Figure 4*b* the state of ionisation is reached during the leading edge of the fourth pulse.

In both cases of Figures 4*a* and 4*b* it is necessary that the value of the resistance $R_9$ be large enough to cause immediate deionisation after ionisation as in the case of known saw-tooth voltage generators. The resulting wave form from the output 5, 6 is in effect a saw-tooth voltage, the fundamental frequency of which is obtained by passing the output from 5, 6 through a filter designed to pass the said fundamental frequency.

Details of a preferred form of the basic circuit are shown in Fig. 5. The gas-discharge valve 10 comprises a plate 11, a cathode 13 and a control grid 12. The plate 11 is connected to the positive terminal of the high tension supply through two resistances 14 and 15, the junction of which is connected to the input terminal 22 through a condenser 24. The cathode 13 is biased positively from a potentiometer comprising resistances 19 and 21 connected across the high tension supply, the usual by-pass condenser 20 being provided.

The grid 12 is connected to earth through a resistance 18 and the output terminal 23 is connected to the plate 11 through a blocking condenser 25. A large condenser 8 is connected across the high tension supply for earthing the resistance 14 as regards transient currents. The input and output terminals 16 and 17 are each connected to ground.

In this circuit, the condenser 24 and resistance 14 correspond respectively to $C_9$ and $R_9$ in Fig. 3. Resistance 15 is provided for limiting the discharge current, and could be omitted if desired. It is, however, useful for assisting in fulfilling the necessary operating conditions outlined above. The by-pass condenser 20 is also not essential and may in some cases be omitted with advantage, but in general it has a stabilising effect on the circuit.

The value of resistance 18 is not critical, but it should be large enough to limit the grid current, but not so large that it prevents the grid potential from returning to the initial value more quickly than the plate potential when the discharge is extinguished.

The circuit of Fig. 5 operates substantially in the same manner as described in connection with Figure 3, and differs only in the provision of the control grid with its associated arrangements, and in the addition of the optional resistance 15.

The output from terminals 17, 23 is passed through a filter FIL designed to pass the desired frequency which is the submultiple $n$ of the input frequency.

In order to vary the submultiple $n$ it is only necessary to vary the bias on the grid of the valve 10, for example, by varying the positive bias on the cathode by adjusting the resistance 21.

Values of 25 to 30 for $n$ may readily be obtained by this embodiment of the invention.

Whilst only two embodiments of the invention have been described by way of example only, others falling within the scope of the appended claims will occur to those skilled in the art.

What is claimed is:

1. In a device for frequency division, in combination, a gas filled rectifier tube having an anode and a cathode, an input source of pulses, a storing condenser having one plate connected to the anode of said rectifier, a source of high voltage connected to the said plate of said storing condenser and to the said anode, a connection from said input source to the other plate of said condenser, and a connection from the other terminal of said input source to the said rectifier cathode and to the other terminal of said high voltage source, an output circuit connected across said rectifier, said condenser being charged by said voltage source and input source and discharged when the voltage thereon exceeds the ionizing voltage of said gas rectifier tube, whereby saw-tooth waves are derived in said output circuit at the frequency of discharging of said gas tube.

2. In a device for obtaining as the output thereof a frequency which is a predetermined submultiple of a given input frequency, in combination, a differential circuit and connections whereby said circuit derives from said input frequency differential pulses of constant amplitude, shape and duration, energy storing means to which said differential pulses are applied, energy discharging means comprising said storing means and a gas discharge device connected thereto, means for adjusting the critical discharge voltage of said discharge device so that after reception of a predetermined number of pulses by said condenser the voltage thereacross initiates a gas discharge to provide a discharge path for said condenser, and means for limiting the amplitude of the pulses produced by said discharge through said discharge device.

3. In a device for obtaining as the output thereof a frequency which is a predetermined submultiple of a given input frequency, in combination, a differential circuit and connections whereby said circuit derives from said input frequency differential pulses of constant amplitude, shape and duration, energy storing means to which said differential pulses are applied, energy discharging means comprising said storing means and a gas discharge device connected thereto, means for adjusting the critical discharge voltage of said discharge device so that after reception of a predetermined number of pulses by said condenser the voltage thereacross initiates a gas discharge to provide a discharge path for said condenser, and an amplitude limiting amplifier receiving its input from said gas discharge device and serving to limit the amplitude of the pulses produced by the discharge through said gas discharge device.

LESLIE WILFRED HOUGHTON.
DERMOT MIN AMBROSE.

REFERENCES CITED

The following references are of record in the file of this patent:

UNITED STATES PATENTS

| Number | Name | Date |
|---|---|---|
| 1,927,425 | Mark | Sept. 19, 1933 |
| 1,933,976 | Hanson | Nov. 7, 1933 |
| 2,016,147 | Lapierre et al. | Oct. 1, 1935 |
| 2,110,015 | Fitzgerald | Mar. 1, 1938 |
| 2,113,011 | White | Apr. 5, 1938 |
| 2,221,452 | Lewis | Nov. 12, 1940 |
| 2,272,998 | Bjornson | Feb. 10, 1942 |
| 2,284,101 | Robins | May 26, 1942 |
| 2,294,863 | Hadfield | Sept. 1, 1942 |

OTHER REFERENCES

R. C. A. Review, pp. 57 to 59, July 1940, vols. 5–6.